United States Patent
Yoshino et al.

(10) Patent No.: US 10,359,766 B2
(45) Date of Patent: Jul. 23, 2019

(54) MEASUREMENT SYSTEM, MEASUREMENT MANAGEMENT APPARATUS, MEASUREMENT DEVICE, AND MEASUREMENT METHOD

(71) Applicant: YOKOGAWA ELECTRIC CORPORATION, Musashino-shi, Tokyo (JP)

(72) Inventors: Hiroki Yoshino, Tokyo (JP); Masato Yamaji, Tokyo (JP); Naoyuki Fujimoto, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 446 days.

(21) Appl. No.: 14/626,962

(22) Filed: Feb. 20, 2015

(65) Prior Publication Data
US 2015/0241871 A1   Aug. 27, 2015

(30) Foreign Application Priority Data
Feb. 27, 2014 (JP) .................. 2014-037157

(51) Int. Cl.
  *G05B 19/418* (2006.01)
  *G05B 19/042* (2006.01)
  *G01D 21/00* (2006.01)
(52) U.S. Cl.
  CPC ......... *G05B 19/4185* (2013.01); *G01D 21/00* (2013.01); *G05B 19/0423* (2013.01); *Y02P 90/14* (2015.11); *Y02P 90/18* (2015.11)

(58) Field of Classification Search
  CPC .......... G05B 19/41; G05B 2219/37591; G05B 19/4185; Y04S 10/522; G01M 3/243; F17D 5/02
  See application file for complete search history.

(56) References Cited

U.S. PATENT DOCUMENTS

| 5,304,800 A | * | 4/1994 | Hoots | ................... | G01M 3/228 250/302 |
| 6,567,006 B1 | * | 5/2003 | Lander | ................. | G01M 3/243 340/605 |

(Continued)

FOREIGN PATENT DOCUMENTS

| JP | 6-311151 A | 11/1994 |
| JP | 2003242130 A | 8/2003 |

(Continued)

*Primary Examiner* — Charles D Garber
*Assistant Examiner* — Alia Sabur
(74) *Attorney, Agent, or Firm* — Sughrue Mion, PLLC

(57) ABSTRACT

A measurement system according to one aspect of the present invention includes a plurality of measurement devices configured to perform measurements at a plurality of sites in a measurement target, respectively, and a measurement management apparatus configured to acquire measured data measured by each of the measurement devices via a communication network. Times timed by the measurement devices are correlated with each other. Each of the measurement devices is configured to transmit the measured data measured based on the correlated time to measurement management apparatus. The measurement management apparatus includes a measured data acquirer configured to acquire the measured data from each of the measurement devices.

19 Claims, 4 Drawing Sheets

(56) References Cited

U.S. PATENT DOCUMENTS

| | | |
|---|---|---|
| 2003/0158682 A1 | 8/2003 | Tanizume |
| 2004/0167745 A1* | 8/2004 | Suzuki ................... H04Q 9/00 702/178 |
| 2006/0048563 A1* | 3/2006 | Martinek .............. G01M 3/243 73/40.5 A |
| 2013/0018620 A1* | 1/2013 | Riendeau ................ G01M 5/00 702/89 |
| 2015/0355045 A1* | 12/2015 | Solomon .................. F17D 5/02 702/36 |

FOREIGN PATENT DOCUMENTS

| | | | |
|---|---|---|---|
| JP | 2005-37247 A | 2/2005 | |
| JP | 4257305 B2 | 4/2009 | |
| JP | 6295955 B2 * | 3/2018 | ............ G01M 3/243 |

* cited by examiner

MEASUREMENT SYSTEM, MEASUREMENT MANAGEMENT APPARATUS, MEASUREMENT DEVICE, AND MEASUREMENT METHOD

BACKGROUND OF THE INVENTION

Field of the Invention

The present invention relates to a measurement system, a measurement management apparatus, a measurement device, and a measurement method.

Priority is claimed on Japanese Patent Application No. 2014-037157, filed on Feb. 27, 2014, the contents of which are incorporated herein by reference.

Description of Related Art

In a petroleum plant, a petrochemical plant or the like, Health, Safety and Environment (HSE) has been considered to be important. Simplification of abnormal detection such as noise and equipment failure in a plant and risk reduction by early estimating the cause become an issue. Therefore, a plant monitoring performed by providing a plurality of measurement devices for detecting noise, vibration or the like in a plant has been adopted.

For example, Japanese Patent Application Laid-Open Publication No. 2005-37247 (hereinafter, referred to as "PTL1") discloses a measurement device for recording occurrence times of events occurred inside the measurement device based on time information timed by an internal timer as an example of measurement device. The collection of measured data by providing such measurement devices at a plurality of sites in a plant enables detection of abnormalities in a plant.

Since, in the measurement device disclosed in PTL 1, the internal timer times the time in each measurement device, each of the plurality of measurement devices provided in the plant does not time the accurate time and the measured data measured by the measurement devices are not correlated to each other. Therefore, even if the measured data are collected from the plurality of measurement devices provided in the plant, there are some cases where the data could not be used effectively and, for example, the occurrence of an abnormality could not be detected accurately.

SUMMARY OF THE INVENTION

One aspect of the present invention provides a measurement system, a measurement management apparatus, a measurement device, and a measurement method, which enable acquisition of effectively usable measured data from each of a plurality of measurement devices.

A measurement system according to one aspect of the present invention may include a plurality of measurement devices configured to perform measurements at a plurality of sites in a measurement target, respectively and a measurement management apparatus configured to acquire measured data measured by each of the measurement devices via a communication network. Times timed by the measurement devices may be correlated with each other. Each of the measurement devices may be configured to transmit the measured data measured based on the correlated time to the measurement management apparatus. The measurement management apparatus may include a measured data acquirer configured to acquire the measured data from each of the measurement devices.

In the above-described measurement system, the measurement management apparatus may further include a measurement time indicator configured to transmit information related to a measurement time of each of the measurement devices to each of the measurement devices. The measured data acquirer is configured to acquire, from each of the measurement devices, the measured data measured by each of the measurement devices based on the measurement time indicated by the information related to the measurement time transmitted from the measurement time indicator.

In the above-described measurement system, the measurement time indicator may be configured to transmit, to different measurement devices, different information indicating execution of measurements and indicating different measurement times to permit the measurement devices to perform measurements at the different measurement times, respectively, as the information related to the measurement time. The different measurement times may be different from each other by a predetermined period of time.

In the above-described measurement system, the measurement time indicator may be configured to transmit, to each of the measurement devices, information indicating execution of measurements and indicating the same measurement time to permit the measurement devices to perform measurements at the same measurement time, as the information related to the measurement time.

In the above-described measurement system, the measurement management apparatus may further include a synchronization time transmitter configured to transmit common time information to each of the measurement devices. Each of the measurement devices may include a timer configured to time a time correlated with the time information transmitted from the synchronization time transmitter.

In the above-described measurement system, the measurement management apparatus may further include an estimator configured to estimate specific matters of the measurement target based on a plurality of measured data acquired by the measured data acquirer.

In the above-described measurement system, the estimator is configured to estimate the specific matters of the measurement target based on at least first measured data measured at a first time and second measured data measured at a second time among the plurality of measured data acquired by the measured data acquirer. The second time may be delayed from the first time by a predetermined period of time.

In the above-described measurement system, the estimator may be configured to estimate the specific matters of the measurement target based on at least a plurality of measured data measured at the same measurement time among the plurality of measured data acquired by the measured data acquirer.

In the above-described measurement system, the estimator may be configured to estimate the specific matters of the measurement target based on a correlation between the plurality of measured data acquired by the measured data acquirer.

A measurement management apparatus according to one aspect of the present invention may a measured data acquirer configured to acquire measured data from a plurality of measurement devices via a communication network. Times timed by the measurement devices may be correlated with each other. The measurement devices may be configured to perform measurements at a plurality of sites in a measurement target, respectively and to generate the measured data based on the correlated time.

The above-described measurement management apparatus may further include an estimator configured to estimate specific matters of the measurement target based on a plurality of measured data acquired by the measured data acquirer.

In the above-described measurement system, the measurement device may include a measure configured to measure the measurement target, a timer configured to time a time correlated with time information acquired from an external apparatus, a measurement controller configured to control the measure to perform measurements when the time timed by the timer reaches a predetermined measurement time, and a measured data transmitter configured to transmit the measured data measured by the measure to the external apparatus communicatively connected to the measurement system via the communication network.

A method for measuring a measurement target according to one aspect of the present invention may include acquiring measured data from a plurality of measurement devices via a communication network, times timed by the measurement devices being correlated with each other and being configured to perform measurements at a plurality of sites in a measurement target, respectively and to generate the measured data based on the correlated time based on the correlated time.

The above-described method for measuring the measurement target may further include transmitting information related to a measurement time of each of the measurement devices to each of the measurement devices. Acquiring the measured data may include acquiring, from each of the measurement devices, the measured data measured by each of the measurement devices based on the measurement time indicated by the information related to the measurement time.

In the above-described method for measuring the measurement target, transmitting the information related to the measurement time may include transmitting, to different measurement devices, different information indicating execution of measurements and indicating different measurement times to permit the measurement devices to perform measurements at the different measurement times, respectively, as the information related to the measurement time. The different measurement times may be different from each other by a predetermined period of time.

In the above-described method for measuring the measurement target, transmitting the information related to the measurement time may include transmitting, to each of the measurement devices, information indicating execution of measurements and indicating the same measurement time to permit the measurement devices to perform measurements at the same measurement time, as the information related to the measurement time.

The above-described method for measuring the measurement target may further includes estimating specific matters of the measurement target based on a plurality of acquired measured data.

In the above-described method for measuring the measurement target, estimating the specific matters may include estimating the specific matters based on at least first measured data measured at a first time and second measured data measured at a second time among the plurality of acquired measured data. The second time may be delayed from the first time by a predetermined period of time.

In the above-described method for measuring the measurement target, estimating the specific matters may include estimating the specific matters based on at least a plurality of measured data measured at the same measurement time among the plurality of acquired measured data.

In the above-described method for measuring the measurement target, estimating the specific matters may include estimating the specific matters based on a correlation between the plurality of acquired measured data.

According to one aspect of the present invention, effectively usable measured data can be acquired from each of a plurality of measurement devices.

DETAILED DESCRIPTION OF THE INVENTION

Hereinafter, an embodiment of the present invention will be described with reference to the drawings.

[Configuration of Measurement System 100]

Figure 1:
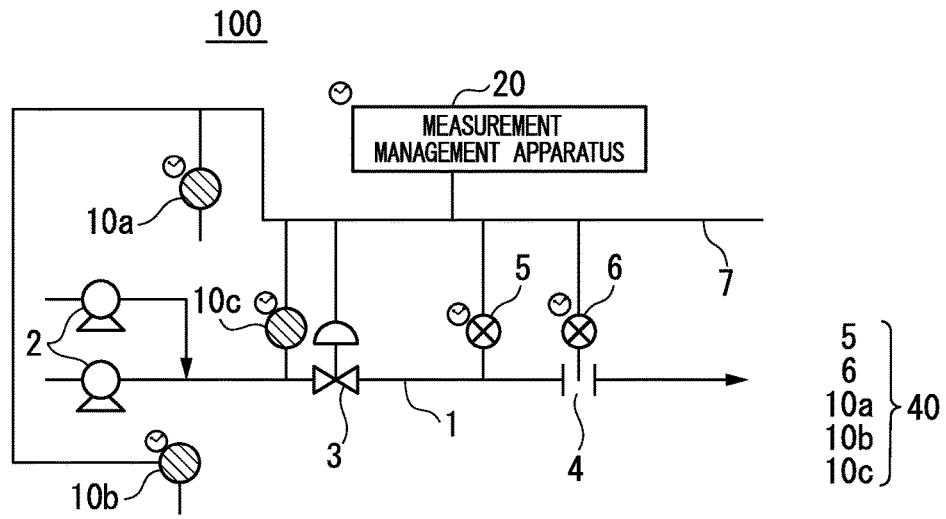
FIG. 1 is a configuration diagram showing one example of schematic configuration of a measurement system according to an embodiment.

FIG. 1 is a configuration diagram showing one example of schematic configuration of the measurement system 100 according to the present embodiment.

The measurement system 100 performs measurements for regularly monitoring an inside of a plant. The plant includes, for example, in addition to an industrial plant such as a chemical industrial plant, a plant for managing and controlling a wellhead such as a gas field and oil field and its surroundings, a plant for managing and controlling an electrical power generation such as water power, fire power, and nuclear power, a plant for managing and controlling an energy harvesting such as photovoltaic power generation and wind-power generation, and a plant for managing and controlling a water and sewerage, a dam, and the like. The measurement system 100 includes a field device 40 (measurement device) configured to measure various physical quantity in the plant. The field device 40 includes, for example, a sensor device such as a flow gauge or temperature sensor, a valve device such as a flow rate control valve or open and close value, an actuator device such as a fan or motor, an imaging device such as a camera or video for taking an image of a target or the situation in a plant, an acoustic device such as a microphone or speaker for collecting abnormal noise or the like in a plant or emitting a warning sound or the like, a position detection device for outputting position information of each device, and other devices. In the example shown in FIG. 1, the measurement system 100 includes a transmitter 5, a differential pressure transmitter 6, and sensors 10a, 10b and 10c as the field device 40.

As shown in FIG. 1, a line 1 provided in the plant is connected to a pimp 2, a positioner and valve 3, the transmitter 5 configured to measure pressure, temperature, flow rate, or the like, an orifice plate 4, the differential pressure transmitter 6 configured to perform a flow measurement using the orifice plate 4.

For example, the differential pressure transmitter 6 is configured to measure fluctuation of pressure inside the line 1 and collects the fluctuation of pressure as time-series data. This enables detection of the clogging of the line 1 and the abnormalities. At this time, for example, data ranging in size from a few kilobytes to tens of kilobytes is used as the time-series data.

Each sensor 10a, 10b, and 10c is a noise sensor equipped with a microphone or a vibration sensor configured to measure the vibration of the line 1. Each sensor 10a, 10b, and 10c is configured to measure sound in a plurality of frequency bands or a vibration peak value or acquires waveform data of vibration in a time domain or in a frequency domain. At this time, for example, data ranging in size from a few kilobytes to a few megabytes is used as the waveform data depending on the number of samples.

Hereinafter, a description will be provided for the case where each sensor 10a and 10b is noise sensor (the sensors 10a and 10b are also referred to as noise sensors 10a and 10b). For example, each sensor 10a and 10b is used to measure the amount of noise or to estimate a noise source in order to improve work environment or to prevent noise pollution. The noise sensors 10a and 10b are always installed in, for example, a plant. In addition, hereinafter, a description will be provided for the case where the sensor 10c is a vibration sensor (the sensor 10c is also referred to as a vibration sensor 10c).

The noise source includes, for example, the line 1 and the pump 2. The case where the line 1 is the noise source includes a case where noise occurred in a noise source other than the line 1 is transmitted through the line 1 or through fluid in the line 1 and a case where noise occurs due to the turbulence of fluid in the line 1 (for example, a pressure loss in the downstream of the orifice plate 4 or a cavitation occurred at the valve in the positioner and valve 3). The vibration sensor 10c is directly attached to, for example, the line 1, measures the vibration of the line 1, and performs the monitoring of the abnormality of the line 1 or the monitoring of the tendency. FIG. 1 shows the example in which the vibration sensor 10c is attached to the line 1. However, the vibration sensor 10c may be attached to another equipment, another device, or the like (for example, the pump 2) to measure the vibration.

The measurement system 100 includes a measurement management apparatus 20. The measurement management apparatus 20 is connected to the positioner and valve 3, the transmitter 5, the differential pressure transmitter 6, the noise sensors 10a and 10b, and the vibration sensor 10c via a communication network 7.

The communication network 7 indicates a communication path used for a current signal in the range of 4 mA to 20 mA transmitted from the transmitter 5 and the differential pressure transmitter 6, a digital signal superimposed on the current signal, a digital signal for field bus communication, industrial wireless communication such as ISA100.11a and Wireless HART (registered mark), or the like. Hereinafter, a description will be provided for the case where the communication network 7 indicates a communication path used for, for example, field bus communication or industrial wireless communication such as ISA100.11a.

The measurement management apparatus 20 is configured to transmit and receive measured data or control information with the positioner and valve 3, the transmitter 5, the differential pressure transmitter 6, the noise sensors 10a and 10b, and the vibration sensor 10c via the communication network 7.

The measurement management apparatus 20 may be configured as a part of a central control device for controlling a plant (for example, a Distributed Control System (DCS) or a Plant Asset Management System (PAM)). For example, the central control device including the measurement management apparatus 20 may be configured to transmit and receive measured data or control information with a device, which is communicatively connected to the central control device via the communication network 7, and may be configured to transmit alarm information indicating an abnormality of process quantity and an abnormality of device.

The measurement system 100 may include a device management tool such as a portable hand held terminal (HHT) or a personal computer (PC). The device management tool may be connected to the positioner and valve 3, the transmitter 5, the differential pressure transmitter 6, the noise sensors 10a and 10b, and the vibration sensor 10c via the communication network 7. The device management tool may be configured to set a measurement range and a tag to a device, which is communicatively connected to the device management tool via the communication network 7. In addition, as is the case with the above-described central control device, the device management tool may be configured to transmit and receive measured data or control information with a device, which is communicatively connected to the device management tool via the communication network 7, and may be configured to transmit alarm information indicating abnormality of process quantity and abnormality of device.

The measured data of the noise sensors 10a and 10b and the vibration sensor 10c may be collected by an apparatus management tool, a noise monitoring tool, or the like separately from the measurement management apparatus 20 (or the central control device including the measurement management apparatus 20) and the tendency of the measured data may be monitored. Measured data, which has been obtained by making a worker go round in the plant, for example, once a year and measure data using a portable noise sensor in addition to the noise sensors 10a and 10b, may be collected and used to generate a noise map. The noise map may be used to review devices for pollution prevention or work environment improvement or to install a sound barrier.

The measurement management apparatus 20 is configured to continuously or intermittently acquire measured data such as pressure, temperature, and flow rate from each of the plurality of field devices 40 (for example, the transmitter 5, the differential pressure transmitter 6, the noise sensors 10a and 10b, and the vibration sensor 10c) via the communication network 7. For example, when the measurement management apparatus 20 is for regularly monitoring a plant, which is a measurement target, the measurement management apparatus 20 may acquire the measured data, which has been measured with a period in the range from a few seconds to a few minutes, ranging from a few hours to a few days, or the like.

If the measurements by the field devices 40 are performed in asynchronization and at different time from each other, it is not easy to correlate the measured data measured by the field devices 40 to each other and to correlate the measurement times of the measured data to each other. Therefore, there are some cases where the occurrence of an abnormality such as noise and equipment failure cannot be detected accurately and the estimation of the site of the abnormality occurrence is not easy. For example, when the noise or the turbulence of fluid in the line 1 occurs due to the abnormality of the pump 2, the occurrence of noise near the noise sensors 10a and 10b can be detected. However, there are some cases where it is not easy to specify the site where the noise source exists. If the distance from a first site where the noise occurs to a second site where the noise sensors 10a and 10b are positioned and the time difference are obtained, the noise source can be estimated. However, if each of the noise sensors 10a and 10b is a portable noise sensor, the position in the process and the relative position between the noise sensors are not determined. Therefore, there are some cases where the estimation of the noise source is not easy. Even if each of the noise sensors 10a and 10b is a stationary sensor, in order to estimate the noise source, information related to an accurate time difference between a first time when the noise occurs and a second time when the noise reaches the noise sensors 10a and 10b is required. Even if the vibration sensor 10c installed to the line 1 detects the abnormality of vibration, it is unclear whether the abnormality is occurring due to the troubles in the pump 2 or the abnormal vibration of the valve 3 positioned in the downstream of the vibration sensor 10c. The same holds true for the differential pressure transmitter 6. Even if the differential pressure transmitter 6 detects the turbulence of fluid in the line 1, there are some cases where it is not easy to specify whether the turbulence is occurring due to the troubles in the pump 2 or the abnormal pressure loss in the downstream of the orifice plate 4.

In the measurement system 100 according to the present embodiment, times timed by the plurality of field devices 40 connected to the communication network 7 are correlated with each other. Measurements at a plurality of sites in the plant may be performed at the same time or at the different measurement times from each other. The different measurement times are different from each other by a constant delay time. Thereby, the measurement system 100 is configured to acquire the measured data measured by each of the plurality of field devices 40 from each of the plurality of field devices 40. The measurement times of the measured data acquire from the field devices 40 are correlated with each other.

Since the measurement system 100 according to the present embodiment facilitates the correlation of the measured data measured at the plurality of the sites in the plant and the correlation of the measurement times, it is possible to promptly, accurately, and easily estimate specific matters such as an abnormality such as noise and equipment failure and the site of the abnormality occurrence.

Hereinafter, the configuration of the measurement system 100 according to the present embodiment will be described in detail.

In order to maintain communication using field bus communication or industrial wireless communication such as ISA100.11a, the measurement management apparatus 20 according to the present embodiment shown in FIG. 1 performs a time-synchronization with respect to the plurality of field devices 40, and acquires the measured data from each of the plurality of field devices 40 via the communication network 7. The measurement times of the measured data acquired from the plurality of field devices 40 are correlated with each other. Each of the plurality of field devices 40 shown in FIG. 1 (the transmitter 5, the differential pressure transmitter 6, the noise sensors 10a and 10b, and the vibration sensor 10c) times a time correlated by performing the time-synchronization by the measurement management apparatus 20, and can perform the measurements at the correlated measurement time.

[Configuration of Measurement Management Apparatus]

Figure 2:
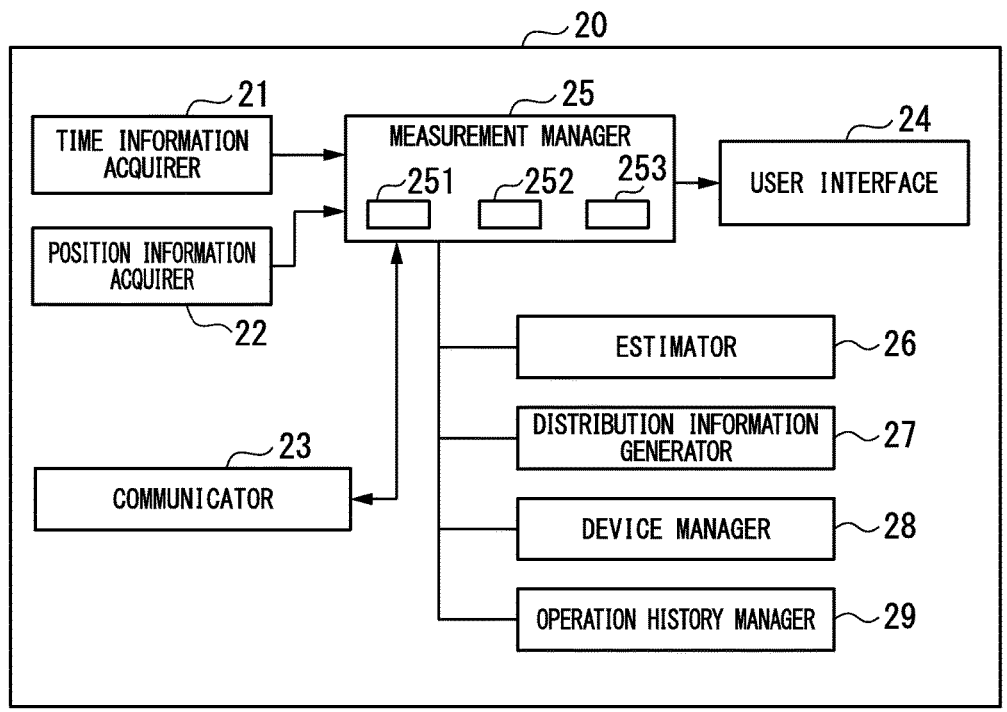
FIG. 2 is a configuration diagram showing one example of schematic configuration of a measurement management apparatus according to the present embodiment.

FIG. 2 is a configuration diagram showing one example of schematic configuration of the measurement management apparatus 20 according to the present embodiment.

The configuration of the measurement management apparatus 20 will be described with reference to FIG. 2.

The measurement management apparatus 20 includes a time information acquirer 21, a position information acquirer 22, a communicator 23, a user interface 24, a measurement manager 25, an estimator 26, a distribution information generator 27, a device manager 28, and an operation history manager 29.

The time information acquirer 21 is configured to acquire time information and provide the acquired time information to the measurement manager 25. For example, the time information acquirer 21 includes a network time protocol (NTP) server configured to receive time information via an internet or a global positioning system (GPS) receiving unit configured to acquire time information based on electrical waves received from a GPS satellite. If the NTP server and the GPS receiving unit are provided outside the time information acquirer 21, the time information acquirer 21 is configured to acquire the time information from the NTP server and the GPS receiving unit provided outside via communication.

The position information acquirer 22 includes, for example, a GPS receiving unit, and is configured to acquire position information of the measurement management apparatus 20 based on electrical waves received from a GPS satellite.

The communicator 23 is configured to communicate with each field device 40 connected to the communication network 7 using field bus communication or industrial wireless communication such as ISA100.11a.

The user interface 24 includes an input configured to receive input information such as a measurement start time and a measurement start delay time input by a user operation and a display configured to display measured results or information indicating specific matters such as an abnormality and a site of abnormality occurrence so as to notify a user of them. For example, the user interface 24 is configured as a touch panel where the input and the display are integrated.

The measurement manager 25 is configured to indicate a measurement time to each field device 40 connected to the communication network 7, and acquire measured data from each field device 40. The measurement manager 25 may have a network management function of field bus communication or industrial wireless communication such as ISA100.11a. For example, the measurement manager 25 has a function of periodically transmitting the time information to each field device 40 connected to the communication network 7 so as to maintain the communication.

In particular, the measurement manager 25 includes a synchronization time transmitter 251, a measurement time indicator 252, and a measured data acquirer 253.

In order to correlate the times to be timed by the field devices 40 with each other, the synchronization time transmitter 251 is configured to transmit common time information for time-synchronization (for example, same time information) to each field device 40 connected to the communication network 7 based on the time information supplied from the time information acquirer 21.

The measurement time indicator 252 is configured to transmit information related to a measurement time when each of the plurality of field devices 40 performs measurements to each field device 40 via the communication network 7. For example, the measurement time indicator 252 is configured to transmit, to each of the transmitter 5, the differential pressure transmitter 6, the noise sensors 10a and 10b, and the vibration sensor 10c, information indicating a measurement time when each of them performs measurements.

In some cases, the measurement time indicator 252 may be configured to transmit, to each of the plurality of field devices 40, information indicating execution of measurements and indicating the same measurement time to permit the field devices 40 to perform measurements at the same measurement time. In other cases, the measurement time indicator 252 may be configured to transmit, to different field devices 40, different information indicating execution of measurements and indicating different measurement times to permit the field devices 40 to perform measurements at the different measurement times, respectively. The different measurement times may be different from each other by a predetermined period of time.

For example, when instant measured values are to be acquired, the information related to the measurement time may include information indicating the instant measurement time. When measured results in a predetermined duration from a certain time are to be acquired, the information related to the measurement time may include information indicating at least a measurement start time. The information indicating the predetermined duration may be included in the information related to the measurement time, or may be set in the field device 40.

The measured data acquirer 253 is configured to acquire measured data from each of the plurality of field devices 40 via the communication network 7. For example, the measured data acquirer 253 is configured to acquire measured data, which each of the plurality of field devices 40 measures, from each of the plurality of field devices 40 based on the measurement time indicated by the information related to the measurement time transmitted from the measurement time indicator 252.

In other words, the measured data acquirer 253 acquires, from each of the plurality of field devices 40, measured data in which the measurement times are correlated with each other.

The measured data acquired by the measured data acquirer 253 includes instantaneous values of noise or vibration, waveform data of noise or vibration in a time domain or in a frequency domain, or the like.

The estimator 26 is configured to estimate specific matters in a measurement target based on measured data measured by the plurality of field devices 40 and acquired by the measured data acquirer 253. The measurement times of the measured data acquired from the field devices 40 are correlated with each other. The specific matters in the measurement target include, for example, an abnormality such as noise and equipment failure, and the site of the abnormality occurrence. For example, by correlating a plurality of measured data acquired by the measured data acquirer 253, the estimator 26 is configured to estimate the specific matters such as a fundamental noise source, failure phenomena of equipment, and the site of the failure occurrence, in other words, the abnormality and the site of the abnormality occurrence.

The distribution information generator 27 is configured to generate distribution information of noise or vibration, distribution information of abnormal site, or the like based on position information of each field device 40 in the plant or map information indicating the position and the measured data of each field device 40 acquired by the measured data acquirer 253.

The device manager 28 is configured to collect the state information or the measured data of each field device 40 in the plant via the communication network 7, display, on the display of the user interface 24, the state information of each field device 40 (for example, any one of the transmitter 5, the differential pressure transmitter 6, the noise sensors 10a and 10b, and the vibration sensor 10c) or the state information of the device such as the line 1, the pump 2, and the positioner and valve 3 based on the state information or the measured data of each field device 40, and store them into a database (not shown).

The operation history manager 29 is configured to record operation histories such as the operation time of a worker under the environment indicated by the distribution information of noise, vibration, or the like or the distribution information of the abnormal sites generated by the distribution information generator 27.

[Configuration of Field Device 40]

Next, the configuration of the field device 40 such as the transmitter 5, the differential pressure transmitter 6, the noise sensors 10a and 10b, and the vibration sensor 10c will be described with reference to FIG. 3.

Figure 3:
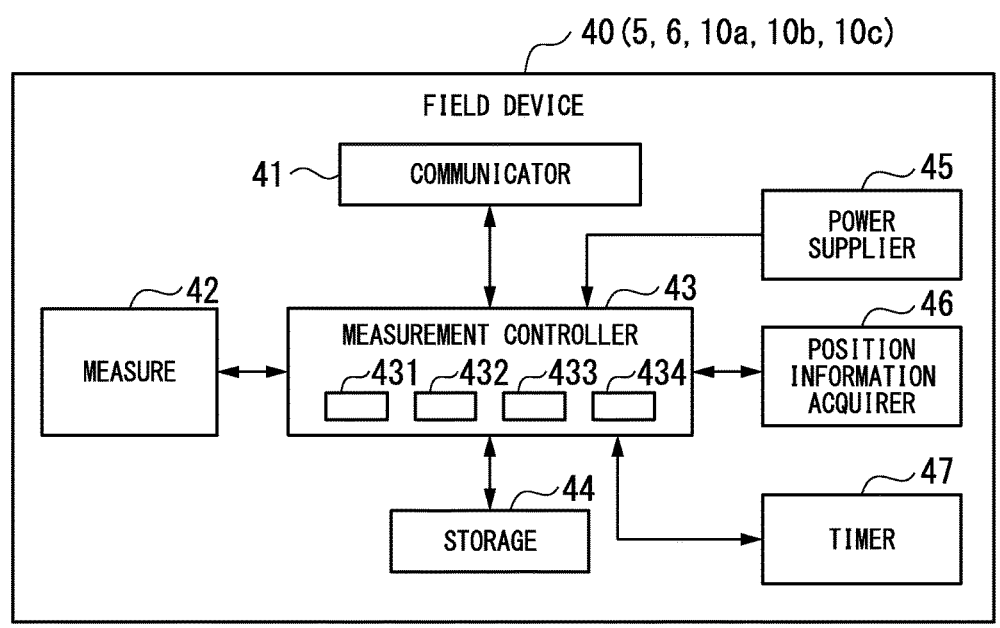
FIG. 3 is a configuration diagram showing one example of schematic configuration of a field device according to the present embodiment.

FIG. 3 is a configuration diagram showing one example of schematic configuration of the field device 40 according to the present embodiment.

In FIG. 3, a description will be provided for the case where the transmitter 5, the differential pressure transmitter 6, the noise sensors 10a and 10b, and the vibration sensor 10c have a similar configuration to each other. However, the configuration of the field device 40 is not limited to the configuration shown in FIG. 3.

The field device 40 (the transmitter 5, the differential pressure transmitter 6, the noise sensors 10a and 10b, and the vibration sensor 10c) includes a communicator 41, a measure 42, a measurement controller 43, a storage 44, a power supplier 45, a position information acquirer 46, and a timer 47 (timer).

The communicator 41 is configured to communicate with the measurement management apparatus 20 (external apparatus) connected to the communication network 7 using field bus communication or industrial wireless communication such as ISA100.11a.

The measure 42 is configured to measure a measurement target. For example, the measure 42 includes a sensor, which is adaptable to measurement specifications of each field device 40 (an acoustic sensor such as a microphone, a vibration sensor, a vibration-type pressure sensor, or the like).

The measurement controller 43 is configured to acquire the measured results from the measure 42, generate measured data, which includes a process value such as a pressure value, sound volume, or the like, based on the acquired measured results, and transmit the generated measured data to the measurement management apparatus 20 via the communicator 41. For example, the measurement controller 43 includes a measured result acquirer 431 configured to acquire measured results from the measure 42 and to generate measured data, and a measured data transmitter 432 configured to transmit the generated measured data via the communicator 41.

The measurement controller 43 further includes a time synchronizer 433 and a measurement time controller 434.

The time synchronizer 433 is configured to acquire common time information for time synchronization transmitted from the measurement management apparatus 20 via the communicator 41. The time synchronizer 433 is configured to adjust the time of the timer 47 based on the acquired time information. Thereby, the timer 47 is configured to time the time which is correlated with the time information acquired from the measurement management apparatus 20.

The timer 47 may include another timer configured to time a period of time in addition to the timer configured to time a time. The timer 47 may be included outside the measurement controller 43 as shown in FIG. 3, or included inside it. Based on the time or the period of time timed by the timer 47, the measurement controller 43 is configured to control the measurement timing and the operation time of each element included in the field device 40 so as to reduce the electrical power.

The measurement time controller 434 is configured to acquire information related to the measurement time of the measure 42 transmitted from the measurement management apparatus 20 via the communicator 41. Based on the time timed by the timer 47 and the acquired measurement time, the measurement time controller 434 is configured to control the measure 42 so that the measure 42 performs measurements at the measurement time.

For example, after the measurement time controller 434 acquires the measurement start time from the measurement management apparatus 20 via the communicator 41, the measurement time controller 434 makes the timer 47 time a time, and makes the measure 42 perform measurements when reaching the measurement start time. The measured result acquirer 431 acquires the measured results from the measure 42, and stores the measured data based on the acquired measured results (instantaneous values of noise or vibration, waveform data of noise or vibration in a time domain or in a frequency domain, or the like) and information indicating the measurement time into the storage 44. After the measurement, the measured data transmitter 432 transmits the measured data to the measurement management apparatus 20 via the communicator 41. The measured data related to information indicating the measurement time, which corresponds to the measured data, may be transmitted. The measured data may include the position information acquired by the position information acquirer 46.

The measurement controller 43 may continuously activate the measure 42, make the measure 42 perform measurements, and acquire the measured results only when reaching the measurement start time.

The storage 44 includes a recoding medium such as a random access memory (RAM), an electrically erasable programmable read-only memory (EEPROM) a flash read-only memory (ROM), and a hard disk drive (HDD), or combination thereof. The storage 44 stores unique information of the sensor included in the measure 42, the measured data based on the measured results measured by the measure 42 (instantaneous values of noise or vibration, waveform data of noise or vibration in a time domain or in a frequency domain, or the like), or the like.

The power supplier 45 is configured to be controlled by the measurement controller 43 and supply electrical power supplied from an external power source or electrical power supplied from a battery installed in the field device 40 to the communicator 41, the measure 42, the measurement controller 43, the storage 44, the power supplier 45, the position information acquirer 46, and the timer 47. The power supplier 45 may configured to supply the electrical power to each element included in the field device 40 via the measurement controller 43 or directly.

The position information acquirer 46 includes, for example, a GPS receiving unit, and acquires the own position information based on electrical waves received from a GPS satellite. The position information acquirer 46 may be configured to calculate the own position information based on the position information supplied from the measurement management apparatus 20 via the communicator 41 and acquire it.

[Communication Process]

Next, a communication process with regard to a measurement performed between the field device 40 and the measurement management apparatus 20 via the communication network 7 will be described with reference to FIG. 4.

Figure 4:
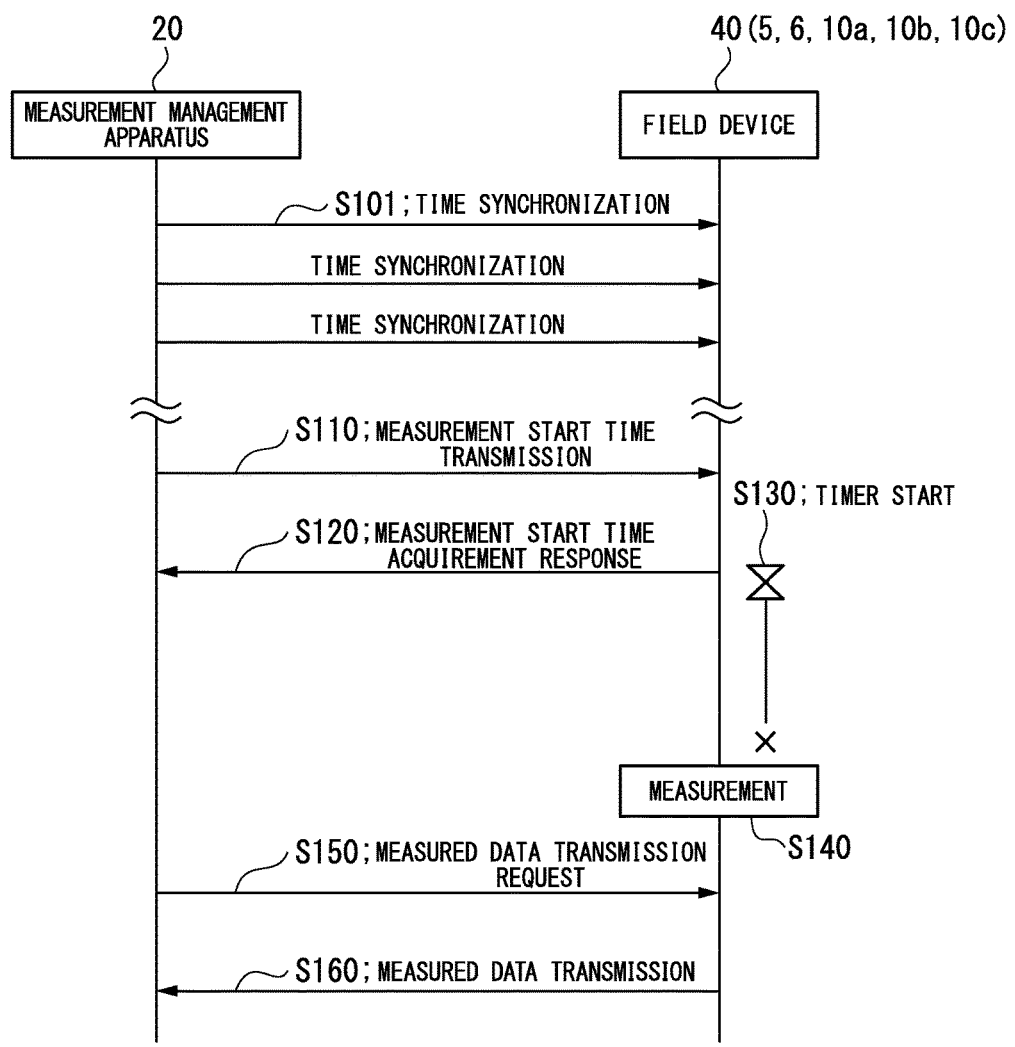
FIG. 4 is a sequence diagram showing one example of measurement process according to the present embodiment.

FIG. 4 is a sequence diagram showing one example of measurement process with regard to measurements according to the present embodiment. Hereinafter, a communication process example in which the measurement management apparatus 20 acquires the measured data measured by each field device 40 at the same measurement time will be described.

The measurement management apparatus 20 periodically transmits common time information (for example, the same time information) used for time synchronization for network management to each field device 40 connected to the communication network 7 (step S101: time synchronization). Each field device 40 adjusts the time of the timer 47 based on the acquired time information. Thereby, each timer 47 included in the field device 40 times a time which is correlated with the time information acquired from the measurement management apparatus 20.

When the user interface 24 receives an input designating a measurement start time by a user operation, the measurement management apparatus 20 transmits information indicating the measurement start time (information to instruct that measurements are performed at the measurement time) to each field device 40 connected to the communication network 7 (step S110: measurement start time transmission). For example, the measurement management apparatus 20 transmits information indicating the same measurement start time instructed by a user to each field device 40. When each field device 40 acquires the information indicating the measurement start time, each field device 40 transmits a response indicating the acquirement to the measurement management apparatus 20 (step S120: measurement start time acquirement response).

When each field device 40 acquires the information indicating the measurement start time, each field device 40 starts the timing of the timer 47 and times a period of time required to reach the measurement start time based on the correlated time information in each field device 40 and the information indicating the measurement start time acquired in the step S120 (step S130).

When the timing by the timer 47 is completed and the time reaches the measurement start time, in each field device 40, measurements by the measure 42 are started and the measured results are stored into the storage 44 (step S140).

Next, when the measurements of each field device 40 are completed, the measurement management apparatus 20 transmits information indicating a transmission request of measured data to each field device 40 after a predetermined period of time (step S150: measured data transmission request). The predetermined period of time is a period of time required to complete the measurement of each field device 40. When each field device 40 acquires the information indicating the transmission request of the measured data from the measurement management apparatus 20, each field device 40 transmits the measured data based on the measured results to the measurement management apparatus 20 (step S160: measured data transmission). Thereby, the measurement management apparatus 20 acquires the measured data, which have been measured at the same measurement time as each other, from the field devices 40. The measurement management apparatus 20 may acquire measured data related to information indicating the measurement time from each field device 40.

If the measured data is relatively large in size such as waveform data and it is impossible to transmit the measured data at one time, each field device 40 may divide the measured data and perform the transmission operation of the divided measured data in plural times (in other words, each field device 40 may perform the process in the step S160 in plural times). Then, the divided measured data may be integrated by the measurement management apparatus 20.

Hereinbefore, the example in which the measurement management apparatus 20 acquires the measured data, which has been measured at the same measurement time by each field device 40. However, the measurement management apparatus 20 may acquire measured data, which have been measured by field devices 40 at different measurement times from each other. The different measurement times may be different from each other by a predetermined period of time (delay time). In this case, in the process of the step S110 shown in FIG. 4, the measurement management apparatus 20 may transmit, to each field device 40, information to instruct that each field devices 40 perform measurements at different measurement times from each other. The different measurement times may be different from each other by a predetermined period of time (delay time). In other cases, the predetermined time difference (delay time) may be set in each field device 40. In this case, the measurement management apparatus 20 may transmit information indicating a criteria measurement time in the process of the step S110 shown in FIG. 4, and acquire, from each field device 40, measured data, which has been measured at a measurement time obtained by adding the predetermined time difference (delay time) to the transmit measurement time.

In FIG. 4, the example in which the field device 40 times the period of time required to the measurement start time using the timer 47 based on the information indicating the measurement start time acquired in the step S110 is described. However, the field device 40 may start measurements when the time of the timer 47 matches the measurement start time without timing the period of time required to reach the measurement start time.

[Operation States of Measurement Management Apparatus 20 and Field Device 40]

Next, the operation states of the measurement management apparatus 20 and the field device 40 in the above-described communication process shown in FIG. 4 will be described.

Figure 5:
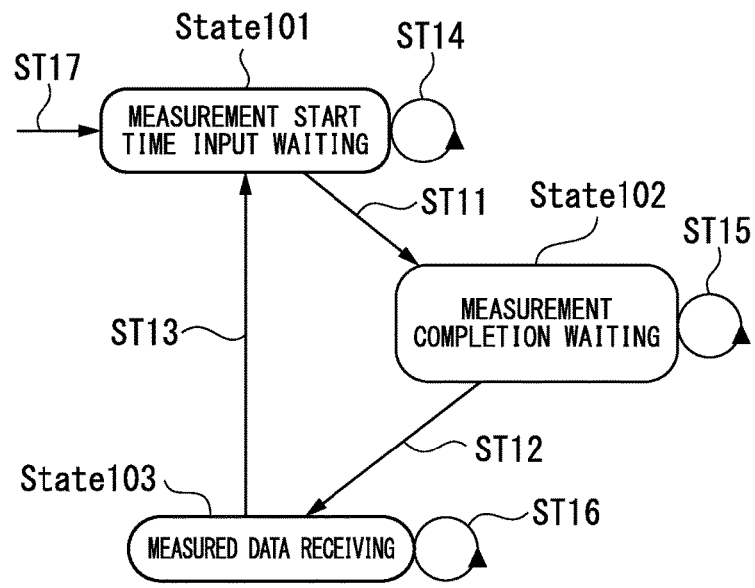
FIG. 5 is a state transition diagram showing operation states of the measurement management apparatus according to the present embodiment.

First, the operation states of the measurement management apparatus 20 will be described with reference to FIG. 5. FIG. 5 is a state transition diagram showing the operation states of the measurement management apparatus 20 according to the present embodiment.

A State 101 indicates a "measurement start time input waiting" state. In the State 101, the measurement management apparatus 20 waits an input designating the measurement start time by a user operation. The measurement manager 25 included in the measurement management apparatus 20 periodically transmits common time information used for network management (for example, the same time information) to each field device 40 connected to the communication network 7 (refer to the step S101 shown in FIG. 4).

When the user interface 24 receives the input designating the measurement start time by the user operation in the "measurement start time input waiting" state of the State 101, the measurement manager 25 transmits the information indicating the measurement start time to each field device 40 (refer to the step S110 shown in FIG. 4) and receives the response, which indicates the acquirement of the information indicating the measurement start time (refer to the step S120 shown in FIG. 4), from each field device 40, and the state of the measurement management apparatus 20 is transited to a State 102 (step ST11).

The State 102 indicates a "measurement completion waiting" state. In the State 102, the measurement management apparatus 20 waits the completion of the measurement of each field device 40. The measurement manager 25 transmits the information indication the transmission request of the measured data to each field device 40 after the time required to perform measurements in each field device 40 passes (refer to the step S150 shown in FIG. 4) and the state of the measurement management apparatus 20 is transited to a State 103 (step ST12).

The State 103 indicates a "measured data receiving" state. In the State 103, the measurement management apparatus 20 receives the measured data from each field device 40 (refer to the step S160 shown in FIG. 4). When the measurement manager 25 completes the receiving of the measured data and acquires the measured data, the measurement manager 25 supplies the acquired measured data to at least one of the estimator 26, the distribution information generator 27, the device manager 28, and the operation history manager 29 and the state of the measurement management apparatus 20 is transited to the "measurement start time input waiting" state of the State 101 (step ST13). If the measurement management apparatus 20 receives the divided measured data, the measurement management apparatus 20 integrates the divided measured data and supplies the integrated measured data to at least one of the estimator 26, the distribution information generator 27, the device manager 28, and the operation history manager 29.

When there is no input designating the measurement start time to the user interface 24 in the "measurement start time input waiting" state of the State 101, the measurement manager 25 monitors the presence or absence of the input designating the measurement start time input and the state of the State 101 is continued (step ST14).

When the time required to perform the measurements in each field device 40 in the "measurement completion waiting" state of the State 102 does not pass, the measurement manager 25 monitors the passing of the measurement time in each field device 40 and the state of the State 102 is continued (step ST15).

When the receiving of the measured data continues in the "measured data receiving" state of the State 103, the measurement manager 25 continues the receiving of the measured data and the state of the State 103 is continued (step ST16).

When the state of the measurement management apparatus 20 is transited from the power-off state to the power-on state (or when the measurement management apparatus 20 is restarted), the measurement management apparatus 20 starts each elements in the device and the state is transited to the "measurement start time input waiting" state of the State 101 (step ST17).

Figure 6:
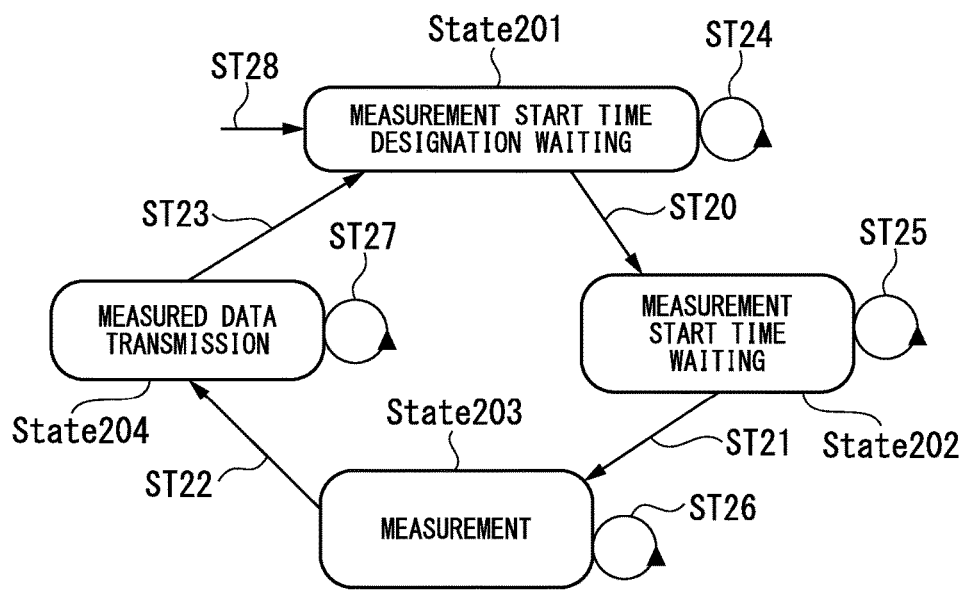
FIG. 6 is a state transition diagram showing operation states of the field device according to the present embodiment.

Next, the operation states of the field device 40 will be described with reference to FIG. 6. FIG. 6 is a state transition diagram showing the operation states of the field device 40 according to the present embodiment.

A State 201 indicates a "measurement start time designation waiting" state. In the State 201, the field device 40 waits the designation of the measurement start time from the measurement management apparatus 20. The measurement controller 43 included in the field device 40 periodically acquire the time information for time synchronization transmitted from the measurement management apparatus 20 (refer to the step S101 shown in FIG. 4), and adjusts the time of the timer 47 based on the acquired time information.

When the measurement controller 43 acquires the information indicating the measurement start time transmitted from the measurement management apparatus 20 in the State 201 (refer to the step S110 shown in FIG. 4), the measurement controller 43 transmits the response indicating the acquirement to the measurement management apparatus 20 (refer to the step S120 shown in FIG. 4) and starts the timing of the timer 47 (refer to the step S130 shown in FIG. 4), and the state of the field device 40 is transited to a State 202 (step ST20).

The State 202 indicates a "measurement start time waiting" state. In the State 202, the field device 40 waits to reach the measurement start time (in other words, the designated measurement start time) indicated by the information indicating the measurement start time, which has been transmitted from the measurement management apparatus 20. When the timing by the timer 47 is completed and the measurement start time is reached (refer to the step S140 shown in FIG. 4), the measurement controller 43 starts the measurements of the measure 42, and the state of the field device 40 is transited to a State 203 (step ST21).

The State 203 indicates a "measuring" state. In the State 203, the field device 40 performs measurements. The measurement controller 43 makes the measure 42 perform the measurements and stores the measured results measured by the measure 42 into the storage 44. When the measurements by the measure 42 is completed and the measurement controller 43 acquires the information indicating the transmission request of the measured data from the measurement management apparatus 20 (refer to the step S150 shown in FIG. 4), the measurement controller 43 starts the transmission of the measured data based on the measured results (refer to the step S160 shown in FIG. 4), and the state of the field device 40 is transited to a State 204 (step ST22).

The State 204 indicates a "measured data transmission" state. In the State 204, the field device 40 transmits the measured data to the measurement management apparatus 20. When the measurement controller 43 completes the transmission of the measured data, the measurement controller 43 clears the timer 47 and the state of the field device 40 is transited to the State 201 (step ST23).

When the measurement controller 43 cannot acquire the information indicating the measurement start time from the measurement management apparatus 20 in the "measurement start time designation waiting" state of the State 201, the measurement controller 43 monitors the presence or absence of the acquirement of the information indicating the measurement start time and the state of the State 201 is continued (step ST24).

When the timing of the timer 47 is not completed and the designated measurement start time is not reached in the "measurement start time waiting" state of the State 202, the measurement controller 43 waits without starting the measurements until the timing of the timer 47 is completed and the state of the State 202 is continued (step ST25).

When the measurements by the measure 42 are not completed in the "measuring" state of the State 203 (in other words, when the measure 42 continues the measurements), the measurement controller 43 continues the measurements by the measure 42 and the state of the State 203 is continued (step ST26).

When the transmission of the measured data is not completed and the transmission is performed in the "measured data transmission" state of the State 204, the measurement controller 43 continues the transmission of the measured data and the state of the State 204 is continued (step ST27). If the measured data is large in size and cannot be transmitted data at one time, the measurement controller 43 divides the measured data and performs the transmission operation of the divided measured data in plural times.

When the state of the field device 40 is transited from the power-off state to the power-on state (or when the field device 40 is restarted), the field device 40 starts each elements in the device and the state is transited to the "measurement start time designation waiting" state of the State 201 (step ST28).

[Estimation of Specific Matters (Abnormal Phenomena and Abnormal Sites)]

Next, the estimation process of the specific matters (abnormal phenomena and abnormal sites) in the plant performed by the measurement management apparatus 20 according to the present embodiment will be described. The estimator 26 included in the measurement management apparatus 20 estimates an abnormality and the site of the abnormality occurrence (specific matters) in the plant, which is the measurement target of the measurement system 100, based on the measured data in which the measurement times are correlated with each other. The measured data is acquired from each of the plurality of field devices 40. For example, the estimator 26 estimates the abnormality and the site of the abnormality occurrence by correlating the measured data in which the measurement times are correlated with each other. The measured data is acquired from each of the plurality of field devices 40.

Hereinafter, regarding a method for estimating specific matters (an abnormality and the site of the abnormality occurrence), two examples will be described.

First Example of Method for Estimating Specific Matters

First, an example will be described in which specific matters (an abnormality and the site of the abnormality occurrence) are estimated based on the measured data of the transmitter 5 and the differential pressure transmitter 6 configured to measure the pressure inside the line 1.

For example, if a time signal of line pressure in the upstream of the orifice plate 4 to be measured by the transmitter 5 is defined as p5($t$) and a time signal of line pressure in the downstream of the orifice plate 4 to be measured by the differential pressure transmitter 6 is defined as p6($t$), a cross-correlation function for calculating a correlation coefficient C, which represents the correlation between p5($t$) and p6($t$), is represented by the following equation 1.

$$C(\tau_1) = \int p5(t)p6(t+\tau_1)dt \qquad \text{(Equation 1)}$$

$t$: Time $\tau_1$: Delay time

A fluid velocity in the line 1 is defined as v and a distance from the installation position of the transmitter 5 to the installation position of the differential pressure transmitter 6 is defined as L. If there is no abnormality between the transmitter 5 and the differential pressure transmitter 6, the value of the correlation coefficient C is maximized when a delay time $\tau_1$ satisfies the following equation 2.

$$\tau_1 = \frac{L}{v} \qquad \text{(Equation 2)}$$

Since the installation positions of the transmitter 5 and the differential pressure transmitter 6 installed to the line 1 are fixed, the installation positions are regarded as known values. The fluid velocity v in the line 1 is measurable by the differential pressure transmitter 6 and is previously measurable. The measurement management apparatus 20 designates a time "T1" (first time) as the measurement start time with respect to the transmitter 5 and designates a time "T1+$\tau_1$" (second time) as the measurement start time with respect to the differential pressure transmitter 6. In this case, when the correlation coefficient C, which is calculated by the equation 1 based on the measured data acquired from the transmitter 5 and the differential pressure transmitter 6, is maximized, this indicates that there is no abnormality between the transmitter 5 and the differential pressure transmitter 6.

By installing the transmitter 5 and the differential pressure transmitter 6 at respective sites of the line 1, the measurement management apparatus 20 can acquire a data string of the line pressure signal at the respective sites. The estimator 26 uses the acquired data string for the calculation of the correlation coefficient C. When the value of the correlation coefficient C is small, the specific matters can be estimated that some abnormality between the transmitter 5 and the differential pressure transmitter 6 is occurring, for example, the turbulence of the fluid flow in the line 1 is occurring due to corrosion or failure of the line 1. Generally, when the flow velocity of vapor (velocity v) is in the range of 20 m/sec to 30 m/sec and the distance L between the transmitter 5 and the differential pressure transmitter 6 is in the range of 2 m to 3 m, the delay time $\tau_1$ is nearly equal to 0.1 sec bases on the equation 2. Generally, the time synchronization accuracy for network management of field bus communication or industrial wireless communication such as ISA100.11a is nearly equal to 0.001 sec. The delay time $\tau_1$ has a value which can be designated in the measurement system 100 according to the present embodiment.

Similarly, when a plurality of vibration sensors 10c is used instead of the transmitter 5 and the differential pressure transmitter 6 and information related to a fluid velocity or a line propagation velocity of vibration in the line 1 is previously prepared, the above-described equation 1 and equation 2 are also adaptable by setting the information as "v". For example, an abnormality such as corrosion or failure of the line 1 and the site of the abnormality occurrence are estimatable.

Second Example of Method for Estimating Specific Matters

Next, an example for estimating the direction of the noise source (abnormality site) based on the measured data of the noise sensors 10a and 10b will be described.

In the example, each noise sensor 10a and 10b has a microphone or the like, the distance between the installation position of the noise sensor 10a and the installation position of the noise sensor 10b is defined as d, the sound source direction is defined as $\theta$, and the sound velocity is defined as c. When a sound arrival time with regard to the sound sensor 10a and the sound sensor 10b is defined as $\sigma T$, the sound source direction $\theta$ is represented by the following equation 3.

$$\theta = \cos^{-1}\left(\frac{\delta T \cdot c}{d}\right) \qquad \text{(Equation 3)}$$

For example, when a time signal of sound measured by the noise sensor 10a is defined as p10a(t) and a time signal of sound measured by the noise sensor 10b is defined as p10b(t), a cross-correlation function for calculating a correlation coefficient Cs, which represents the correlation between p10a(t) and p10b(t), is represented by the following equation 4.

$$C_S(\tau_1) = \int p10a(t) p10b(t+\tau_1) dt \qquad \text{(Equation 4)}$$

t: Time
$\tau_1$: Delay time

The arrival time difference $\sigma T$ is obtained using a time when the correlation coefficient Cs is maximized. The measurement management apparatus 20 designates a plurality of pairs of the measurement start time and the delay time $\tau_1$ to the noise sensors 10a and 10b, and the estimator 26 performs the calculation of the equation (4) based on the measured data measured at each designated pair of the measurement start time and the delay time $\tau_1$ Thereby, the delay time $T_1$ at the maximum of the correlation coefficient Cs can be gradationally obtained. Thereby, the estimator 26 can estimate the sound source direction $\theta$ based on the above-described equation 3 using the delay time $T_1$ at the maximum of the correlation coefficient Cs as the arrival time difference $\sigma T$.

SUMMARY

As described above, the measurement system 100 according to the embodiment includes the plurality of field devices 40 (an example of measurement device), each of which is configured to perform measurements at each of a plurality of sites in a measurement target, and the measurement management apparatus 20 configured to acquire measured data measured by each of the plurality of field devices 40 via the communication network 7. In the plurality of field devices 40, the times are correlated with each other, and each field devices 40 is configured to transmit measured data measured based on the correlated time. The measurement management apparatus 20 includes the measured data acquirer 253 configured to acquire measured data from each field devices 40.

For example, the measurement management apparatus 20 further includes the synchronization time transmitter 251 configured to transmit common time information to each of the plurality of field devices 40. Each of the plurality of field devices 40 includes the timer 47 (timer) configured to time the time correlated with the time information transmitted from the synchronization time transmitter 251.

Thereby, the measurement system 100 (measurement management apparatus 20) according to the present embodiment uses time information to be transmitted to the plurality of field devices 40, which are connected to the communication network 7 for field bus communication or industrial wireless communication such as ISA100.11a, to perform a communication synchronization. Thereby, the measurement system 100 can correlate measurement times of the plurality of field devices 40, which are positioned at a plurality of sites in a plant, with each other. Since the measurement system 100 (measurement management apparatus 20) can acquire, from the field devices 40, measured data where the measurement time are correlated with each other, the measurement system 100 can correlate these measured data. Therefore, the measurement system 100 (measurement management apparatus 20) can acquire effectively usable measured data from each of the plurality of field devices 40.

The measurement management apparatus 20 may include the estimator 26 configured to estimate specific matters of a measurement target (an abnormality and the site of the abnormality occurrence) based on a plurality of measured data acquired by the measured data acquirer 253.

Thereby, the measurement system 100 (measurement management apparatus 20) can estimate an abnormality and the site of the abnormality occurrence by correlating the measured data acquired from the field devices 40. Therefore, the measurement system 100 (measurement management apparatus 20) according to the present embodiment can easily estimate an abnormality and the site of the abnormality occurrence in a measurement target (for example, in a plant).

The measurement management apparatus 20 further includes the measurement time indicator 252 configured to transmit, to each of the plurality of field devices 40, information related to a measurement time (for example, a measurement start time) when each field device 40 performs measurements. The measured data acquirer 253 is configured to acquire, from each of the plurality of field devices 40, measured data measured by each field device 40 based on the measurement time, which is indicated by the information related to the measurement time transmitted from the measurement time indicator 252.

Thereby, the measurement system 100 (measurement management apparatus 20) can designate the measurement time of each of the plurality of field devices 40. Therefore, the measurement management apparatus 20 can acquire the measured data measured at a correlated arbitrary measurement time from each of the plurality field devices 40.

In some cases, for example, the measurement time indicator 252 may transmit, to each of the plurality of field devices 40, information, which instructs that each field device 40 performs the measurements at the same measurement time, as the information related to the measurement time. In other cases, the measurement time indicator 252 may transmit, to each of the plurality of field devices 40, information, which instructs that each field device 40 performs the measurements at different measurement times from each other, as the information related to the measurement time. The different measurement times may be different from each other by a predetermined period of time.

Thereby, the measurement system 100 (measurement management apparatus 20) enables each of the plurality of field devices 40 to perform the measurements at the same time or to perform the measurements at different measurement times. The different measurement times may be different from each other by a constant delay time.

For example, since, conventionally, measured data measured by each field device 40 at different measurement time from each other has been acquired, there are some cases where the measurement times of the measured data are not correlated, an abnormality cannot be detected accurately, and it is not easy to specify the site of the abnormality occurrence. On the other hand, in the measurement system 100 according to the present embodiment, each of the plurality of field devices 40 is subjected to the periodical time-synchronization via the communication network 7 and the field devices 40 perform measurements at the same time or at the delayed time by a designated period of time based on the designated measurement time. Therefore, the measurement system 100 can correlate the measured data.

In other words, the estimator 26 may estimate specific matters of measurement target (an abnormality and the site of the abnormality occurrence) based on the correlation between a plurality of measured data acquired by the measured data acquirer 253.

As described above, since it is easy to correlate the measured data at the plurality of sites in the plant and to correlate the measurement times of the measured data with each other in the measurement system 100 (measurement management apparatus 20), it is possible to promptly, accurately, and easily estimate specific matters such as an abnormality such as noise and equipment failure and the site of the abnormality occurrence.

In some cases, in particular, the estimator 26 included in the measurement management apparatus 20 may estimate specific matters of measurement target (an abnormality and the site of the abnormality occurrence) based on at least a plurality of measured data measured at the same measurement time among a plurality of measured data acquired by the measured data acquirer 253. In other cases, the estimator 26 may estimate specific matters of measurement target (an abnormality and the site of the abnormality occurrence) based on at least a plurality of measured data measured at different measurement times from each other among a plurality of measured data acquired by the measured data acquirer 253. The different measurement times may be different from each other by a predetermined period of time.

For example, the estimator 26 may estimate specific matters of measurement target (an abnormality and the site of the abnormality occurrence) based on at least first measured data measured at a first time (for example, the time "T1" described in the above-described "First example of Method for estimating specific matters") and second measured data measured at a second time, which is delayed from the first time by a predetermined period of time, (for example, the time "T1+$\tau_1$" described in the above-described "First example of Method for estimating specific matters") among a plurality of measured data acquired by the measured data acquirer 253.

Thereby, the measurement system 100 (measurement management apparatus 20) can easily estimate an abnormality such as corrosion and failures of the line 1, the site of the abnormality occurrence, a direction of a noise source, or the like by correlating the measured data measured by the plurality of the field devices 40 at the same time or correlating the measured data measured by the plurality of the field devices 40 at different measurement times from each other. The different measurement times may be different from each other by a constant period of time (delay time).

In the above-described embodiment, the example where the measurement management apparatus 20 designates the measurement time to each of the plurality of the field devices 40. However, the present invention is not limited to this example. For example, the same measurement time as each other or the different measurement times from each other is previously set in each of the plurality of the field devices 40 and the measurements may be performed at the set measurement time. The different measurement times may be different from each other by a predetermined period of time.

The measurement management apparatus 20 may estimate an abnormality or the site of the abnormality occurrence based on a plurality of measured data (measured data measured at the same measurement time, or measured data measured at different measurement times from each other in which the different measurement times are different from each other by a predetermined period of time) acquired by acquiring measured data related to information indicating a measurement time from each of the plurality of field devices 40.

The field devices 40 (an example of measurement device) includes the measure 42 configured to measure a measurement target, the timer 47 (an example of timer) configured to time a time correlated with time information acquired from an external apparatus (for example, the measurement management apparatus 20), the measurement controller 43 configured to control the measure 42 to perform measurements when the time timed by the timer 47 reaches a predetermined measurement time, and the measured data transmitter 432 configured to transmit the measured data measured by the measure 42 to an external apparatus (for example, the measurement management apparatus 20) communicatively connected to the field devices 40 via the communication network 7. In some cases, the predetermined measurement time may be a measurement time designated as a time when the field device 40 performs measurements and transmitted from the measurement management apparatus 20. In other cases, the predetermined measurement time may correspond to the same measurement time or the different measurement times from each other previously set in each of the plurality of field devices 40. The different measurement times may be different from each other by a predetermined period of time.

As described above, one field device 40 can transmit measured data measured at a measurement time correlated with that of another field device 40 to the measurement management apparatus 20. Therefore, the measurement system 100 can easily estimate an abnormality of a measurement target and the site of the abnormality occurrence based on measured data in which the measurement times are correlated with each other. The measured data is acquired from each of the plurality of field devices 40.

For example, the field device 40 may be a measurement device connected to the measurement management apparatus 20 via the communication network 7, and the timer 47 may time a time correlated with time information acquired from the measurement management apparatus 20. The measurement controller 43 may acquire, from the measurement management apparatus 20, information related to a measurement time when the measurement 42 performs measurements and control the measurement 42 to perform measurements at the measurement time based on the time timed by the timer 47 and the acquired information related to the measurement time. The measured data transmitter 432 may transmit the measured data measured by the measure 42 to the measurement management apparatus 20 communicatively connected to the measured data transmitter 432 via the communication network 7.

Thereby, the field device 40 can be time-synchronized with respect to the time information, which is transmitted from the measurement management apparatus 20 connected to the communication network 7 for field bus communication or industrial wireless communication such as ISA100.11a so as to perform communication synchronization. In addition, the field device 40 can perform measurements at the measurement time designated by the measurement management apparatus 20 and transmit the measured data to the measurement management apparatus 20. Therefore, the measurement system 100 can easily estimate an abnormality of measurement target and the site of the abnormality occurrence based on the measured data in which the measurement times are correlated with each other. The measured data is acquired from each of the plurality of field devices 40.

The measurement process for acquiring, from each field device 40, measured data in which the measurement times are correlated with each other described in the above embodiment may be continuously performed or be performed only in an abnormal state where an abnormality is occurring. For example, the measurement system 100 may simply determine whether an abnormality is occurring or not based on measured data asynchronously measured by each field device 40 in a normal state in which an abnormality is not occurring (somewhat less-accurate simple determination) and may acquire measured data in which the measurement times are correlated with each other from each field device 40 in an abnormal state in which an abnormality is occurring and accurately estimate an abnormality or the site of the abnormality occurrence (accurate determination (estimation)).

In the above-described embodiment, the example where the measurement management apparatus 20 transmits time information for time-synchronization to each of the plurality of field devices 40 and each field device 40 performs time-synchronization based on the time information was described. However, the present invention is not limited to this example. For example, the measurement management apparatus 20 and each of the plurality of field devices 40 may include an NTP server configured to be supplied with time information via an internet, a GPS receiving unit configured to acquire time information based on electrical waves received from a GPS satellite, or the like and may time the same time based on the supplied time information or the received time information. The time information used for the time-synchronization is not limited to the time information supplied to the NTP server and the time information received from the GPS satellite and may be other time information. For example, time information received from a wireless station configured to transmit standard waves, time information superimposed on airwaves for television or radio, time information superimposed on control signals transmitted from a mobile phone base station, or the like may be used for time-synchronization.

A part of or all of functions of each element included in the measurement management apparatus 20 according to the above-described embodiment or a part of or all of functions of each element included in the field device 40 may be implemented by a computer. In this case, the above-described functions may be implemented by recording a program for implementing the above-described functions into a computer readable storage medium, making a computer system read the program stored in the storage medium, and executing the program. The "computer system" may be embedded in the measurement management apparatus 20 or the field device 40 and include an operating system and a hardware such as a peripheral device.

If the World Wide Web is used, the "computer system" may include an environment for providing homepage (or display environment).

The "computer readable storage medium" indicates a portable medium such as a flexible disk, a magnetic optical disk, a read-only memory (ROM), a CD-ROM and a storage device such as a hard-disk embedded in a computer system. In addition, the "computer readable storage medium" may include a medium for dynamically storing a program in a short time like a communication wire used to transmit a program via a communication line such as a network including the Internet and a phone line and a medium for storing a program for a given length of time like a volatile memory embedded in a computer system, which is a server or client in that case. The above-described program may be used to implement a part of the above-described functions and may implement the above-described functions in cooperation with another program previously stored in the computer system.

The measurement management apparatus 20 or a part of or all of the field devices 40 according to the above-described embodiment may be implemented as a integrated circuit such as a large-scale integration (LSI). In some cases, each function block of the measurement management apparatus 20 or the field device 40 may be implemented by its own processor. In other cases, a part of or all of function blocks of the measurement management apparatus 20 or the field device 40 may be integrated and implemented by a processor. The method for integrating a circuit is not limited to LSI and may be implemented by a dedicated communication circuit or a general-purpose processor. When a technique for integrating a circuit as a substitute for LSI appears with the development of semiconductor technology, the integrated circuit based on this technique may be adopted.

Although the foregoing has been a description of the embodiment of the present invention with reference to the drawings, the specific configuration of the present invention is not limited to the embodiments described above, and can be freely modified within the scope of the present invention. For example, the functions described in the above-described embodiment can be arbitrary integrated to each other.

What is claimed is:

1. A measurement system comprising:
   a first transmitter configured to measure a pressure at a first site inside a line provided in a plant;
   a second transmitter configured to measure a pressure at a second site inside the line, the second site being positioned in the downstream of the first site inside the line; and
   a measurement management apparatus,
   wherein times timed by the first transmitter and the second transmitter are correlated with each other,
   wherein the first transmitter and the second transmitter are configured to transmit first measured data and second measured data measured based on the correlated time to the measurement management apparatus, respectively,
   wherein the measurement management apparatus comprises:
   a measured data acquirer configured to acquire the first measured data and the second measured data from the first transmitter and the second transmitter, respectively, and
   an estimator configured to estimate at least one of abnormality and a site of abnormality occurrence in the line based on at least a delay time, the first measured data measured by the first transmitter at a first time, and the second measured data measured by the second transmitter at a second time among a plurality of measured data acquired by the measured data acquirer, the second time being delayed from the first time by the delay time, and
   wherein the measurement management apparatus further comprises:
   a measurement time indicator configured to transmit, to the first transmitter, information related to a first measurement time at which the first transmitter measures the pressure and transmit, to the second transmitter, information related to a second measurement time at which the second transmitter measures the pressure, the second measurement time being delayed from the first measurement time by the delay time.

2. The measurement system according to claim 1, wherein the measured data acquirer is configured to acquire, from each of the first transmitter and the second transmitter, the measured data measured by each of the first transmitter and the second transmitter based on the measurement time indicated by the information related to the measurement time transmitted from the measurement time indicator.

3. The measurement system according to claim 2, wherein the measurement time indicator is configured to transmit, to the first transmitter and the second transmitter, different information indicating execution of measurements and indicating different measurement times to permit the first transmitter and the second transmitter to perform measurements at the different measurement times, respectively, as the information related to the measurement time, and the different measurement times are different from each other by the delay time.

4. The measurement system according to claim 2, wherein the measurement time indicator is further configured to transmit, to each of the first transmitter and the second transmitter, information indicating execution of measurements and indicating the same measurement time to permit the first transmitter and the second transmitter to perform measurements at the same measurement time.

5. The measurement system according to claim 1, wherein the measurement management apparatus further comprises:
   a synchronization time transmitter configured to transmit common time information to each of the first transmitter and the second transmitter, and
   each of the first transmitter and the second transmitter comprises:
   a timer configured to time a time correlated with the time information transmitted from the synchronization time transmitter.

6. The measurement system according to claim 1, wherein the estimator is further configured to estimate the at least one of the abnormality and the site of abnormality occurrence in the line based on at least a plurality of measured data measured at the same measurement time among the plurality of measured data acquired by the measured data acquirer.

7. The measurement system according to claim 1, wherein each of the first transmitter and the second transmitter comprises:
   a measure configured to measure the line;
   a timer configured to time a time correlated with time information acquired from an external apparatus;
   a measurement controller configured to control the measure to perform measurements when the time timed by the timer reaches a predetermined measurement time; and
   a measured data transmitter configured to transmit the measured data measured by the measure to the external apparatus communicatively connected to the measurement system via the communication network.

8. A measurement management apparatus comprising:
   a measured data acquirer configured to acquire first measured data and second measured data from a first transmitter and a second transmitter via a communication network, respectively, the first transmitter measuring a pressure at a first site inside a line provided in a plant, the second transmitter measuring a pressure at a second site inside the line, the second site being positioned in the downstream of the first site inside the line, times timed by the first transmitter and the second transmitter being correlated with each other, the first measured data and the second measured being measured based on the correlated time, and an estimator configured to estimate at least one of abnormality and a site of abnormality occurrence in the line based on at least a delay time, the first measured data measured by the first transmitter at a first time and the second measured data measured by the second transmitter at a second time among a plurality of measured data acquired by the measured data acquirer, the second time being delayed from the first time by the delay time, wherein the measurement management apparatus further comprises:

a measurement time indicator configured to transmit, to the first transmitter, information related to a first measurement time at which the first transmitter measures the pressure and transmit, to the second transmitter, information related to a second measurement time at which the second transmitter measures the pressure, the second measurement time being delayed from the first measurement time by the delay time.

9. A measuring method, comprising:

acquiring first measured data and second measured data from a first transmitter and a second transmitter via a communication network, respectively, the first transmitter measuring a pressure at a first site inside a line provided in a plant, the second transmitter measuring a pressure at a second site inside the line, the second site being positioned in the downstream of the first site inside the line, times timed by the first transmitter and the second transmitter being correlated with each other, the first measured data and the second measured being measured based on the correlated time;

estimating at least one of abnormality and a site of abnormality occurrence in the line based on at least a delay time, the first measured data measured by the first transmitter at a first time and the second measured data measured by the second transmitter at a second time among a plurality of measured data acquired, the second time being delayed from the first time by the delay time; and transmitting, to the first transmitter, information related to a first measurement time at which the first transmitter measures the pressure and transmitting, to the second transmitter, information related to a second measurement time at which the second transmitter measures the pressure, the second measurement time being delayed from the first measurement time by the delay time.

10. The measuring method according to claim 9, further comprising:

acquiring the first measured data and the second measured data includes acquiring, from each of the first transmitter and the second transmitter, the first measured data and the second measured data measured by each of the first transmitter and the second transmitter based on the measurement time indicated by the information related to the measurement time.

11. The measuring method according to claim 10, wherein transmitting the information related to the measurement time includes transmitting, to the first transmitter and the second transmitter, different information indicating execution of measurements and indicating different measurement times to permit the first transmitter and the second transmitter to perform measurements at the different measurement times, respectively, as the information related to the measurement time, and the different measurement times are different from each other by the delay time.

12. The measuring method according to claim 10, further comprising:

transmitting, to each of the first transmitter and the second transmitter, information indicating execution of measurements and indicating the same measurement time to permit the first transmitter and the second transmitter to perform measurements at the same measurement time.

13. The measuring method according to claim 9, further comprising:

estimating the at least one of the abnormality and the site of abnormality occurrence in the line based on at least a plurality of measured data measured at the same measurement time among the plurality of acquired measured data.

14. A measurement system comprising:

a first sensor configured to measure sound at a first site in a measurement target provided in a plant;

a second sensor configured to measure sound at a second site in the measurement target; and a measurement management apparatus, wherein times timed by the first sensor and the second sensor are correlated with each other, wherein the first sensor and the second sensor are configured to transmit first measured data and second measured data measured based on the correlated time to the measurement management apparatus, respectively, wherein the measurement management apparatus comprises:

a measured data acquirer configured to acquire the first measured data and the second measured data from the first sensor and the second sensor, respectively, and an estimator configured to estimate at least one of abnormality and a site of abnormality occurrence in the measurement target based on at least a delay time, the first measured data measured by the first sensor at a first time and the second measured data measured by the second sensor at a second time among a plurality of measured data acquired by the measured data acquirer, the second time being delayed from the first time by the delay time, and wherein the measurement management apparatus further comprises:

a measurement time indicator configured to transmit, to the first sensor, information related to a first measurement time at which the first sensor measures the sound and transmit, to the second sensor, information related to a second measurement time at which the second sensor measures the sound, the second measurement time being delayed from the first measurement time by the delay time.

15. A measurement management apparatus comprising:

a measured data acquirer configured to acquire first measured data and second measured data from a first sensor and a second sensor via a communication network, respectively, the first sensor measuring sound at a first site in a measurement target provided in a plant, the second sensor measuring sound at a second site in the measurement target, times timed by the first sensor and the second sensor being correlated with each other, the first measured data and the second measured being measured based on the correlated time, an estimator configured to estimate at least one of abnormality and a site of abnormality occurrence in the measurement target based on at least a delay time, the first measured data measured by the first sensor at a first time and the second measured data measured by the second sensor at a second time among a plurality of measured data acquired by the measured data acquirer, the second time being delayed from the first time by the delay time; and a measurement time indicator configured to transmit, to the first sensor, information related to a first measurement time at which the first sensor measures the sound and transmit, to the second sensor, information related to a second measurement time at which the second sensor measures the sound, the second measurement time being delayed from the first measurement time by the delay time.

16. A measuring method, comprising:

acquiring first measured data and second measured data from a first sensor and a second sensor via a communication network, respectively, the first sensor measuring sound at a first site in a measurement target provided in a plant, the second sensor measuring sound at a second site in the measurement target, times timed by the first sensor and the second sensor being correlated with each other, the first measured data and the second measured being measured based on the correlated time;

estimating at least one of abnormality and a site of abnormality occurrence in the measurement target based on at least a delay time, the first measured data measured by the first sensor at a first time and the second measured data measured by the second sensor at a second time among a plurality of measured data acquired, the second time being delayed from the first time by the delay time; and transmitting, to the first sensor, information related to a first measurement time at which the first sensor measures the sound and transmitting, to the second sensor, information related to a second measurement time at which the second sensor measures the sound, the second measurement time being delayed from the first measurement time by the delay time.

17. A measurement system comprising:

a first measurement device configured to perform measurements at a first site in a measurement target provided in a plant;

a second measurement device configured to perform measurements at a second site in the measurement target; and a measurement management apparatus, wherein times timed by the first measurement device and the second measurement device are correlated with each other, wherein the first measurement device and the second measurement device are configured to transmit first measured data and second measured data measured based on the correlated time to the measurement management apparatus, respectively, wherein the measurement management apparatus comprises:

a measured data acquirer configured to acquire the first measured data and the second measured data from the first measurement device and the second measurement device, respectively, and an estimator configured to estimate at least one of abnormality and a site of abnormality occurrence in the measurement target based on at least a delay time, the first measured data measured by the first measurement device at a first time and the second measured data measured by the second measurement device at a second time among a plurality of measured data acquired by the measured data acquirer, the second time being delayed from the first time by the delay time, and wherein the measurement management apparatus further comprises:

a measurement time indicator configured to transmit, to the first measurement device, information related to a first measurement time at which the first measurement device performs the measurements and transmit, to the second measurement device, information related to a second measurement time at which the second measurement device performs the measurements, the second measurement time being delayed from the first measurement time by the delay time.

18. A measurement management apparatus comprising:

a measured data acquirer configured to acquire first measured data and second measured data from a first measurement device and a second measurement device via a communication network, respectively, the first measurement device performing measurements at a first site in a measurement target provided in a plant, the second measurement device performing measurements at a second site in the measurement target, times timed by the first measurement device and the second measurement device being correlated with each other, the first measured data and the second measured being measured based on the correlated time, an estimator configured to estimate at least one of abnormality and a site of abnormality occurrence in the measurement target based on at least a delay time, the first measured data measured by the first measurement device at a first time and the second measured data measured by the second measurement device at a second time among a plurality of measured data acquired by the measured data acquirer, the second time being delayed from the first time by the delay time, and a measurement time indicator configured to transmit, to the first measurement device, information related to a first measurement time at which the first measurement device performs the measurements and transmit, to the second measurement device, information related to a second measurement time at which the second measurement device performs the measurement, the second measurement time being delayed from the first measurement time by the delay time.

19. A measuring method, comprising:

acquiring first measured data and second measured data from a first measurement device and a second measurement device via a communication network, respectively, the first measurement device performing measurements at a first site in a measurement target provided in a plant, the second measurement device performing measurements at a second site in the measurement target, times timed by the first measurement device and the second measurement device being correlated with each other, the first measured data and the second measured being measured based on the correlated time;

estimating at least one of abnormality and a site of abnormality occurrence in the measurement target based on at least a delay time, the first measured data measured by the first measurement device at a first time and the second measured data measured by the second measurement device at a second time among a plurality of measured data acquired, the second time being delayed from the first time by the delay time; and transmitting, to the first measurement device, information related to a first measurement time at which the first measurement device performs the measurements and transmitting, to the second measurement device, information related to a second measurement time at which the second measurement device performs the measurement, the second measurement time being delayed from the first measurement time by the delay time.

* * * * *